United States Patent
Goodwin et al.

(10) Patent No.: US 9,070,124 B2
(45) Date of Patent: Jun. 30, 2015

(54) SELF-SERVICE CHECK CASHING SYSTEM AND METHOD

(75) Inventors: John C. Goodwin, Suwanee, GA (US); Harris Roth, Lawrenceville, GA (US)

(73) Assignee: NCR Corporation, Duluth, GA (US)

( * ) Notice: Subject to any disclaimer, the term of this patent is extended or adjusted under 35 U.S.C. 154(b) by 191 days.

(21) Appl. No.: 13/571,007

(22) Filed: Aug. 9, 2012

(65) Prior Publication Data

US 2013/0322732 A1 Dec. 5, 2013

Related U.S. Application Data

(60) Provisional application No. 61/653,916, filed on May 31, 2012.

(51) Int. Cl.
*G06K 9/00* (2006.01)
*G06Q 20/04* (2012.01)
*G06Q 20/18* (2012.01)

(52) U.S. Cl.
CPC .............. *G06Q 20/042* (2013.01); *G06Q 20/18* (2013.01)

(58) Field of Classification Search
CPC ....................................................... G06K 9/00
USPC ......................................................... 382/139
See application file for complete search history.

(56) References Cited

U.S. PATENT DOCUMENTS

| | | | | |
|---|---|---|---|---|
| 5,992,570 A * | 11/1999 | Walter et al. | ..................... | 186/36 |
| 7,780,077 B1 * | 8/2010 | Warren et al. | ................. | 235/379 |
| 2002/0152170 A1 * | 10/2002 | Dutta et al. | ..................... | 705/45 |
| 2003/0023557 A1 * | 1/2003 | Moore | ............................ | 705/50 |
| 2004/0122754 A1 * | 6/2004 | Stevens, III | ..................... | 705/35 |
| 2004/0245330 A1 * | 12/2004 | Swift et al. | ..................... | 235/379 |
| 2005/0097046 A1 * | 5/2005 | Singfield | .......................... | 705/42 |
| 2005/0236476 A1 * | 10/2005 | Murray et al. | ................. | 235/383 |
| 2006/0041506 A1 * | 2/2006 | Mason et al. | .................... | 705/42 |
| 2009/0076934 A1 * | 3/2009 | Shahbazi et al. | ................ | 705/30 |
| 2011/0087598 A1 * | 4/2011 | Bozeman | ........................ | 705/45 |
| 2011/0320358 A1 * | 12/2011 | Harris et al. | .................... | 705/45 |

* cited by examiner

*Primary Examiner* — Stephen R Koziol
*Assistant Examiner* — Delomia Gilliard
(74) *Attorney, Agent, or Firm* — Paul W. Martin; Joseph P. Mehrle

(57) ABSTRACT

A self-service check cashing system and method which performs preliminary tests on a check to reduce queue length at attendant check cashing stations. An example method includes obtaining an amount of a check from a customer by the self-service terminal, obtaining information from an image of a check by the self-service terminal, performing a plurality of tests by the self-service terminal, including tests using the information from the image to determine whether the check was properly completed; and displaying instructions to the customer by the self-service terminal to go to an attendant terminal to complete a second phase of the check cashing transaction when the self-service terminal determines that the test results were positive.

18 Claims, 5 Drawing Sheets

SELF-SERVICE CHECK CASHING SYSTEM AND METHOD

CROSS-REFERENCE TO RELATED APPLICATIONS

This application claims the benefit of U.S. Provisional Application No. 61/653,916, filed May 31, 2012.

BACKGROUND

This present invention relates to check processing methods and more specifically to a self-service check cashing system and method.

Non-bank check acceptance retailers provide check cashing services for individuals at a check cashing station. An attendant at the station visually performs a preliminary examination of checks. The preliminary examination takes enough time that on a typical check cashing day, such as on pay days or at end of month, long queues form at attendant check cashing stations.

Therefore, it would be desirable to provide a self-service check cashing system and method for non-bank check acceptance retailers which reduces queue length at attendant check cashing stations, but provides reliable information and controls fraud.

SUMMARY

In accordance with the teachings of the present invention, a self-service check cashing system and method is provided.

An example method includes obtaining an amount of a check from a customer by the self-service terminal, obtaining information from an image of a check by the self-service terminal, performing a plurality of tests by the self-service terminal, including tests using the information from the image to determine whether the check was properly completed; and displaying instructions to the customer by the self-service terminal to go to an attendant terminal to complete a second phase of the check cashing transaction when the self-service terminal determines that the test results were positive.

BRIEF DESCRIPTION OF THE DRAWINGS

The present invention may take form in various components and arrangement of components and in various methods. The drawings are only for purposes of illustrating example embodiments and alternatives and are not to be construed as limiting the invention.

DETAILED DESCRIPTION

Figure 1:
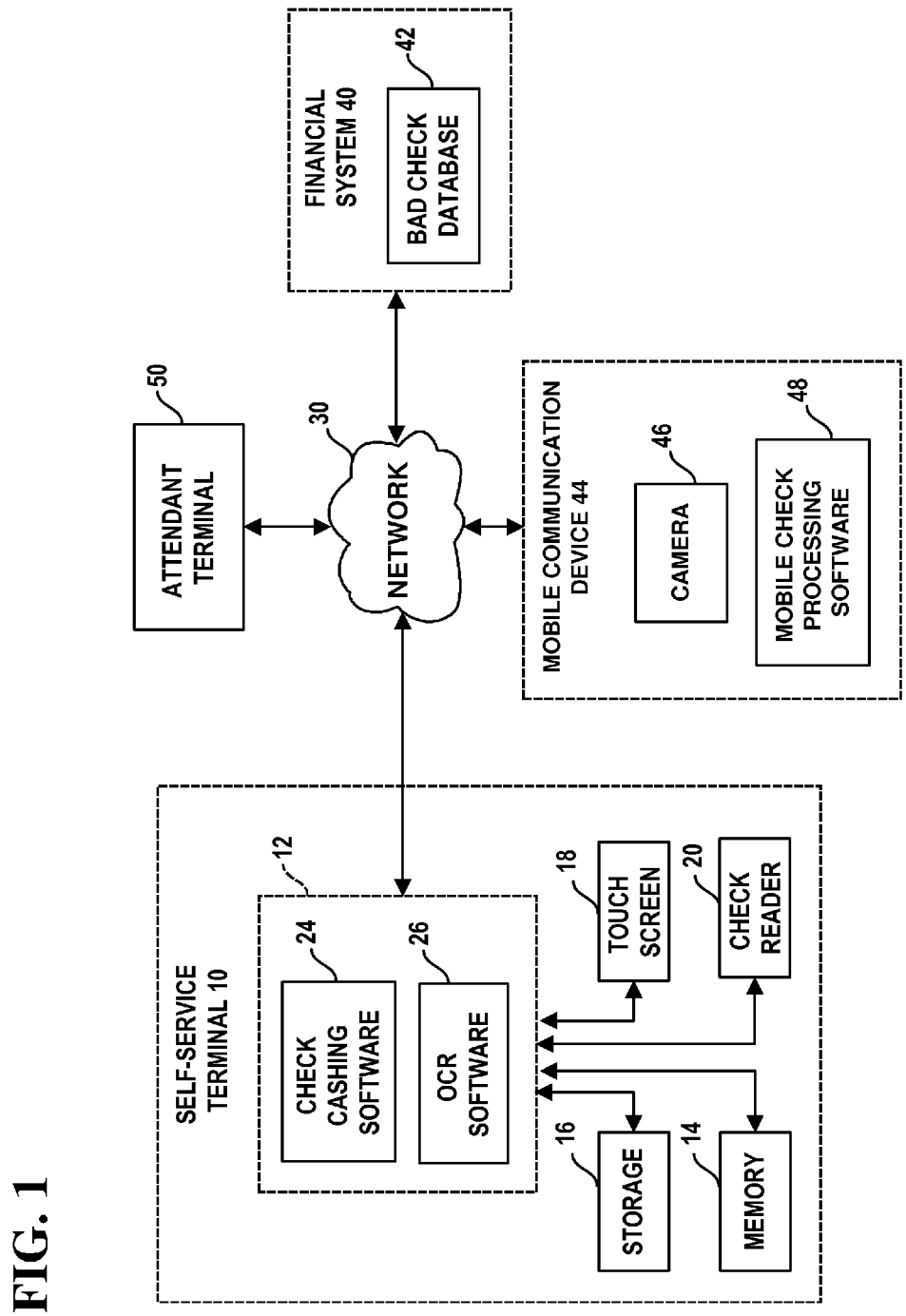
FIG. 1 is a block diagram of an example check cashing system.

With reference to FIG. 1, an example self-service terminal 10 includes processor 12, memory 14, program and data storage 16, a display, and one or more user input devices. The display and user input device may be combined as a touch screen 18. Self-service terminal 10 additionally includes components and peripherals necessary to accomplish its purpose, including graphics circuitry for connecting to the display, network circuitry for connecting to network 30, check reader 20, and printer 22.

Check reader 20 captures front and back side images of a physical check and reads a magnetic ink character recognition (MICR) code line from the front side of the check. Any type of check is envisioned, personal or otherwise.

Processor 12 executes check cashing software 24 for displaying instructions, issuing prompts, and receiving inputs from users through touch screen 18. Check cashing software 24 may include a collection of different screens tailored to performing a check cashing transaction.

Check cashing software 24 processes check images and magnetic ink character information captured from a check. For this purpose, check cashing software 24 uses optical character recognition (OCR) software 26. OCR software 26 identifies alphanumeric text information in check images.

Check cashing software 24 a preliminary examination of check features in a way that substantially replaces the visual examination that would have otherwise been performed by an attendant. If check cashing software 24 examines the check features and finds no errors, then check cashing software 24 connects to financial system 40 to compare the number of the check with check numbers stored in bad check database 42. If the comparison fails to result in a match, then check cashing software 24 allows the check cashing transaction to proceed.

If check cashing software 24 finds any errors, then check cashing software 24 denies the transaction. Otherwise, check cashing software 24 sends the results of the preliminary examination to attendant terminal 50 via network 30 and instructs the customer to see an attendant at attendant terminal 50 for the next phase of the transaction. In one example embodiment, check cashing software 24 may additionally generate a chit with could be printed to present to the attendant to verify the transaction. The chit may include a number or barcode or both.

In another example embodiment, a customer may pre-stage the check cashing transaction using mobile communication device 44. Mobile communication device 44 includes a camera 46 for capturing an image of the check. The customer selects an option presented by check cashing software 24 to process the captured image from mobile communication device 44. Check cashing software 24 may display a barcode, such as a QR code, identifying self-service terminal 10 as the destination for the captured check image. Mobile communication device 44 scans and decodes the barcode to obtain information identifying self-service terminal 10, and then sends the captured check image with the identifying information to financial system 40 via network 30. Financial system 40 then routes the captured check image to self-service terminal 10.

Mobile communication device 44 may include, but not be limited to, a smart phone, personal digital assistant, or other portable communication device.

Mobile communication device 44 may execute web browser software to display web pages from financial system 40.

Mobile communication device 44 may alternatively or in addition download application software to pre-stage the check cashing transaction. For example, financial system 40 may provide mobile check processing software 48 for download from the web site hosted by financial system 40.

In one example embodiment, mobile check processing software 48 may be written in a programming language such as the Java programming and be hosted within the browser software.

As another example, mobile check processing software 48 may include a script, such as JavaScript, combined with hypertext markup language (HTML) or other suitable web page language.

As another example, mobile check processing software 48 may include a software applet written to be executed within the operating system of the smart phone.

Figure 2:
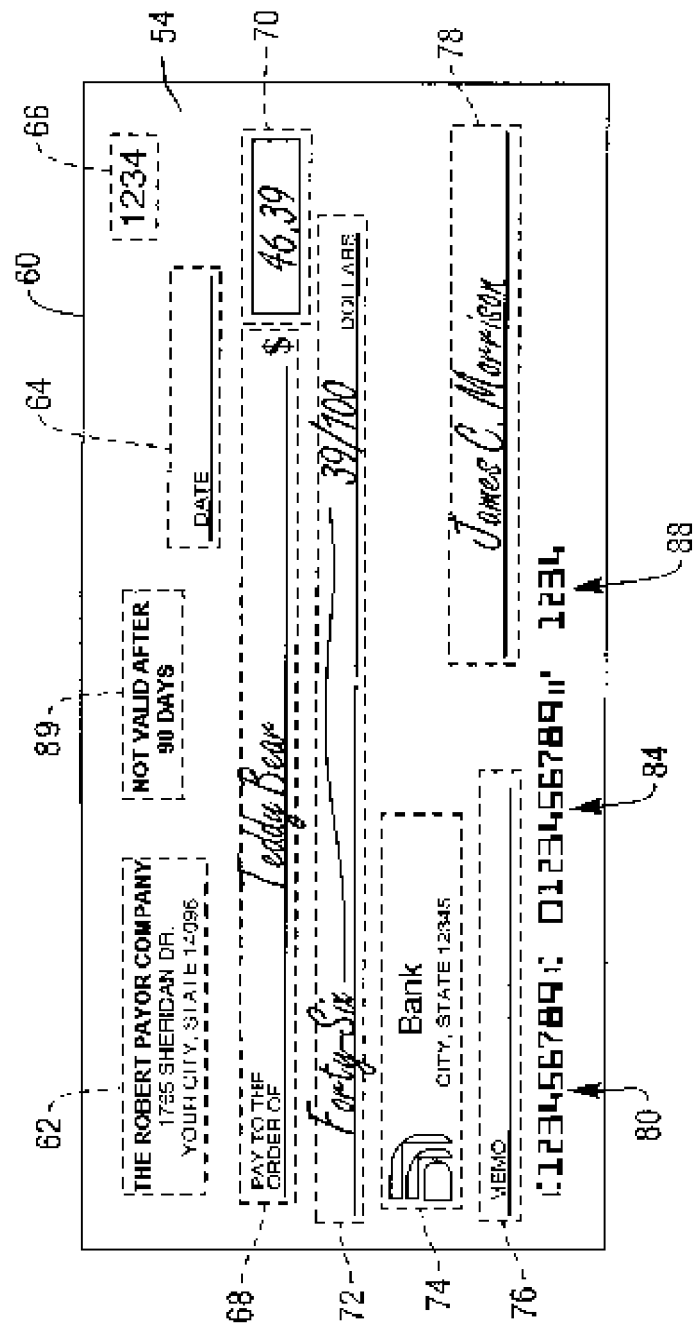
FIG. 2 is a representation an image of a front side of a personal check.

Referring to FIG. 2, a front side 54 of a typical check 60 is illustrated. Check 60 is made of sheet material and includes a payer field 62, a date field 64, a check number field 66 located in the upper-right corner of the check, and a payee field 68. Check 60 also includes a courtesy amount field 70, a legal amount field 72, a paying bank name field 74, a memo field 76, and a payer signature field 78. Check 60 has a MICR code line 58 which comprises a routing/transit number 80, an account number 84, and a check number 88. Check 60 may additionally include a "not valid after" field 89. Each field of check 60 contains pre-printed information therein, such as shown in FIG. 2. Other arrangements of routing/transit numbers, account numbers, and check numbers are possible.

Figure 3:
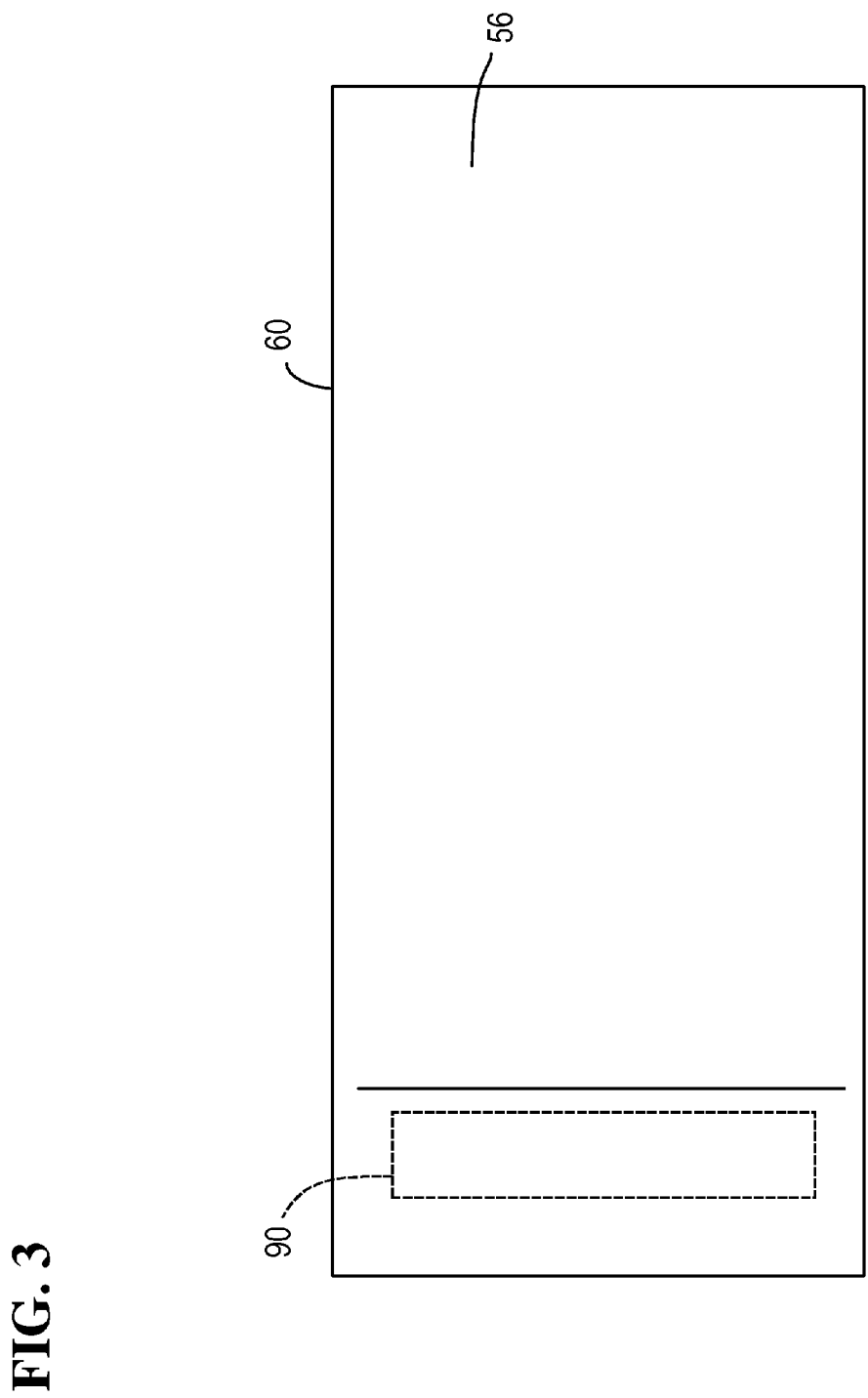
FIG. 3 is a representation an image of a back side of a personal check.

Referring to FIG. 3, a back side 56 of a check 60 is illustrated. Back side 56 may include an endorsement field 90.

Figure 4A:
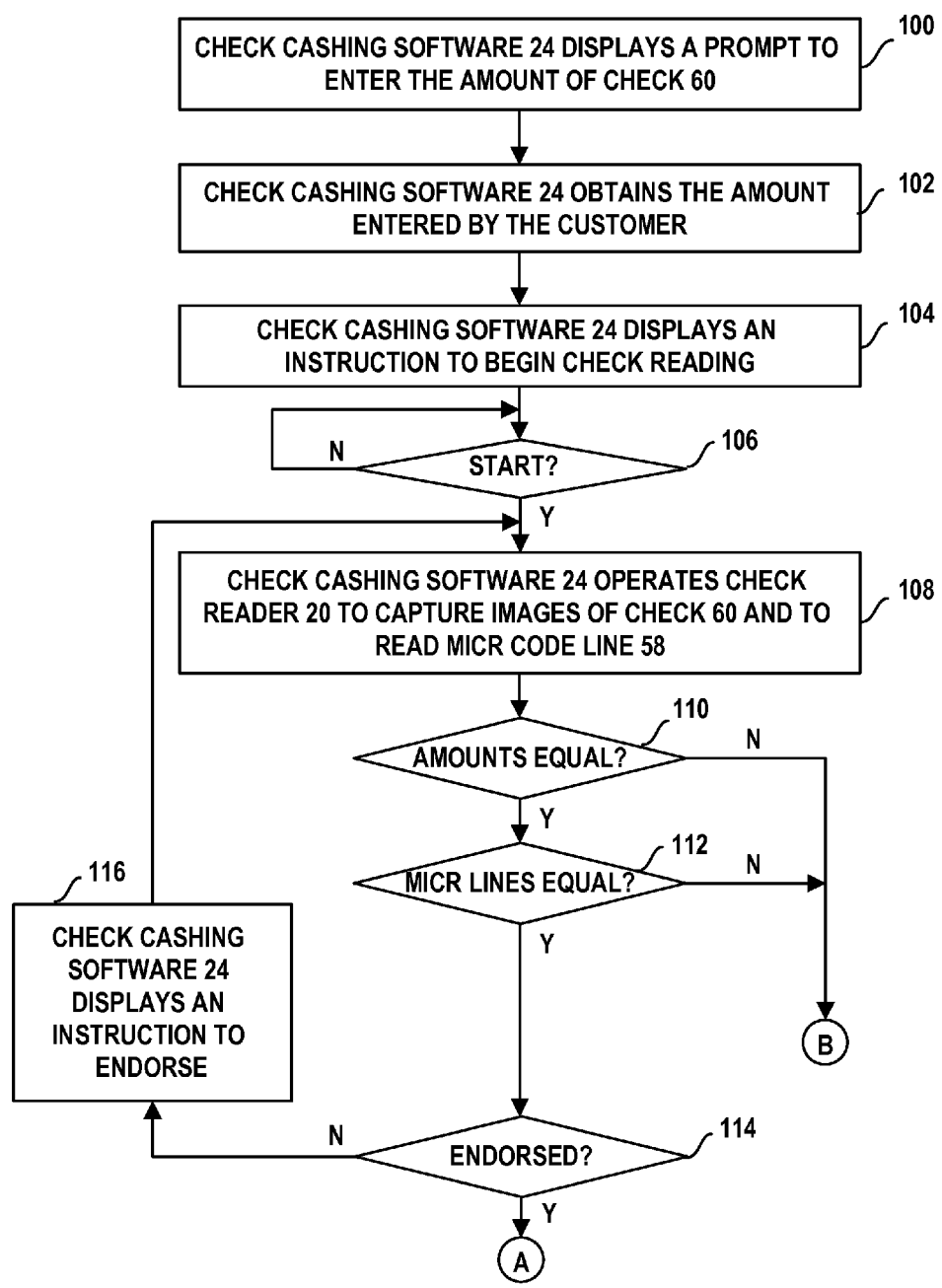
FIGS. 4A and 4B depict a flow diagram of an example method of cashing a check.
Figure 4B:
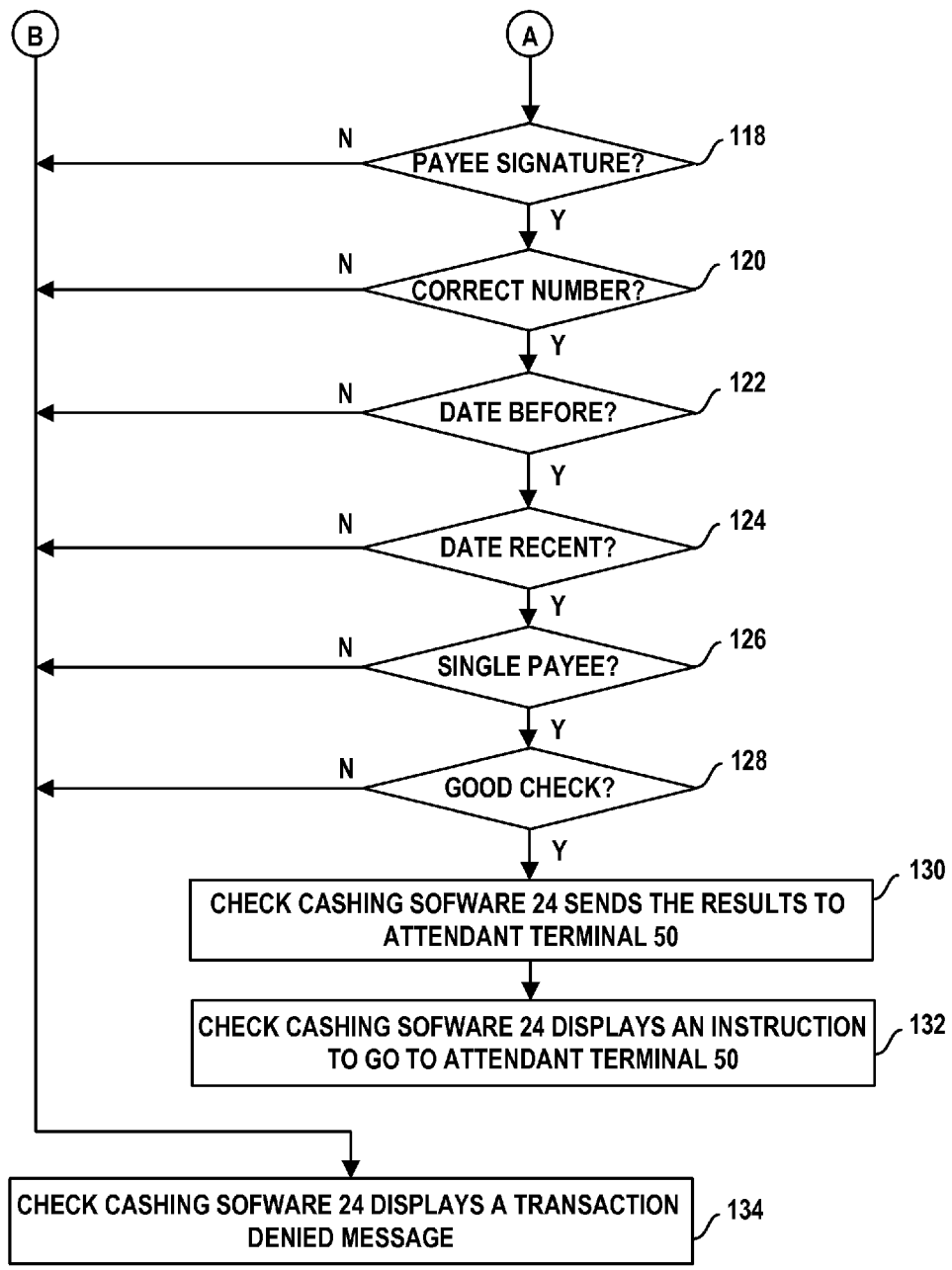

Referring to FIGS. 4A and 4B, a flowchart depicts an example method of operation of a the check cashing software 24.

In step 100, check cashing software 24 displays a prompt to the customer to enter the amount of check 60. Check cashing software 24 may also instruct the customer to provide additional information, such as the customer's name, address, and telephone number.

In step 102, check cashing software 24 obtains the amount and any additional information entered by the customer via touch screen 18.

In step 104, check cashing software 24 displays an instruction to insert check 60 into check reader 20 and to select a start button to begin check reading.

In step 106, check cashing software 24 waits for the customer to select the start button. When the customer selects the start button, operation proceeds to step 110.

In step 108, check cashing software 24 operates check reader 20 to capture images of front and back sides 54 and 56 of check 60 and to read MICR code line 58.

In steps 110-126, check cashing software 24 performs one or more tests in any order. Additional tests may also be included and performed in any order.

In step 110, check cashing software 24 compares the customer entered amount, the courtesy amount obtained by OCR software 26 from courtesy amount field 70 of the front side image (FIG. 2), and the legal amount obtained by OCR software 26 from legal amount field 72 of the front side image (FIG. 2). If any one of the amounts does not match, then check cashing software 24 displays a message denying the transaction in step 134. Otherwise operation may continue to another test.

In step 112, check cashing software 24 compares the MICR code line 58 obtained from check reader 20 to MICR code line information obtained by OCR software 26 from the front side image of FIG. 2. If they do not match, then check cashing software 24 displays a message denying the transaction in step 134. Otherwise operation may continue to another test.

In step 114, check cashing software 24 determines whether check 60 has an endorsement signature in endorsement field 90 of the rear side image (FIG. 3). If so, operation may continue to another test in step 120. Otherwise, operation proceeds to step 116.

In step 116, check cashing software 24 causes check reader 20 to eject check 60 and displays an instruction to the customer to endorse check 60, re-insert it into check reader 20, and select a retry button. After the customer selects the retry button, operation returns to step 108.

In step 118, check cashing software 24 determines whether check 60 has a signature in payer signature field 78 of the front side image (FIG. 2). If not, then check cashing software 24 displays a message denying the transaction in step 134. Otherwise operation may continue to another test.

In step 120, check cashing software 24 determines whether MICR code line 58 obtained from check reader 20 and/or obtained by OCR software 26 from the front side image (FIG. 2) has additional numbers, indicating that check 60 has been previously deposited. If so, then check cashing software 24 displays a message denying the transaction in step 134. Otherwise operation may continue to another test.

In step 122, check cashing software 24 determines whether date information in date field 64 obtained by OCR software 26 from the front side image (FIG. 2) is later than a current date. If so, then check cashing software 24 displays a message denying the transaction in step 134. Otherwise operation may continue to another test.

In step 124, check cashing software 24 determines whether issue date information in date field 64 obtained by OCR software 26 from the front side image (FIG. 2) is older than a predetermined date. For example, if check 60 includes "not valid after" information, check cashing software 24 determines whether the issue date information is older than a date determined from information in the "not valid after" date. In FIG. 2, "not valid after" field 89 includes a valid period of ninety days from issuance. If "not valid after" information is not located on check 60, check cashing software 24 may use a configurable timeframe calculated from information in date field 64. For example, check cashing software 24 may be pre-configured to deny checks 60 with issue dates older than a predetermined time period, such as ninety days. If so, then check cashing software 24 displays a message denying the transaction in step 134. Otherwise operation may continue to another test.

In step 126, check cashing software 24 determines whether payee information in payee field 68 obtained by OCR software 26 from the front side image (FIG. 2) includes "and" or "&" or other indication of multiple payees. If so, then check cashing software 24 displays a message denying the transaction in step 134. Otherwise operation may continue to another test.

If check 60 passes all of the preliminary tests in steps 110-126, then operation proceeds to step 128.

In step 128, check cashing software 24 connects to bad check database 52 and compares the check number to check numbers in bad check database 52. If the check number is in bad check database 52, then check cashing software 24 displays a message denying the transaction in step 134. Otherwise, operation continues to step 130.

In step 130, check cashing software 24 sends the results of the tests to attendant terminal 50.

In step 132, check cashing software 24 displays an instruction to see an attendant at attendant terminal 50 for further processing.

An attendant at attendant terminal 50 may perform additional tests. If check 60 passes all the additional tests, then the attendant keeps check 60 and provides payment to the customer.

Although the present invention has been described with particular reference to certain preferred embodiments thereof, variations and modifications of the present invention can be effected within the spirit and scope of the following claims.

What is claimed is:

1. A method of operating a self-service terminal to perform a first phase of a check cashing transaction comprising:
    obtaining an amount of a check from a customer by the self-service terminal;
    obtaining information from an image of the check by the self-service terminal;
    performing a plurality of tests by the self-service terminal, including tests using the information from the image to determine whether the check was properly completed and when the information includes a not-valid after date ensuring that the not-valid after date has not passed as one of the tests; and
    displaying instructions to the customer by the self-service terminal to go to an attendant terminal to complete a second phase of the check cashing transaction when the self-service terminal determines that the test results were positive and sending results of the plurality of tests to an attendant terminal associated with the attendant over a network, wherein the results represent preliminary examination as to whether the check was properly completed by the customer.

2. The method of claim 1, further comprising:
    obtaining the image from the check reader.

3. The method of claim 1, further comprising:
    obtaining the image from a mobile device of the customer.

4. The method of claim 1, wherein one of the tests comprises comparing the amount from the customer with a corresponding amount determined from the image of the check.

5. The method of claim 1, further comprising obtaining characters printed in magnetic ink using a check reader by the self-service terminal.

6. The method of claim 5, wherein one of the tests comprises comparing the characters printed in magnetic ink with corresponding characters determined from the image of the check.

7. The method of claim 5, wherein one of the tests comprises determining whether a number of characters printed in magnetic ink is greater than a predetermined amount.

8. The method of claim 1, wherein one of the tests comprises determining whether the check image contains an endorsement signature.

9. The method of claim 1, wherein one of the tests comprises determining whether the check image contains a payee signature.

10. The method of claim 1, wherein one of the tests comprises determining whether issue date information obtained from the check image is later than a current date.

11. The method of claim 1, wherein one of the tests comprises determining whether issue date information obtained from the check image older than a predetermined date.

12. The method of claim 1, wherein one of the tests comprises determining whether payee information obtained from the check image includes multiple payees.

13. The method of claim 1, wherein one of the tests comprises determining whether a check number obtained from the check image is stored within a bad check database.

14. The method of claim 1, further comprising displaying a transaction denied message to the customer by the self-service terminal when the self-service terminal determines that a number of the test results were negative.

15. A self-service terminal for performing a first phase of a check cashing transaction comprising:
    an input device for recording an amount of a check entered by a customer; and
    a processor for obtaining information from an image of the check, for performing a plurality of tests, including tests using the information from the image to determine whether the check was properly completed, and for displaying instructions to the customer to go to an attendant terminal to complete a second phase of the check cashing transaction when the test results were positive and the processor to send results from the plurality of tests to the attendant terminal over a network and to cause a chit to be printed from the self-service terminal for the customer to present to an attendant associated with the attendant terminal as verification of the check cashing transaction, wherein the results represent preliminary examination as to whether the check was properly completed by the customer, and when the information includes a not-valid after date ensuring that the not-valid after date has not passed as one of the tests.

16. The self-service terminal of claim 15, further comprising a check reader for capturing the image.

17. The self-service terminal of claim 16, wherein the check reader also reads characters printed in magnetic ink.

18. The self-service terminal of claim 15, wherein the processor obtains the image from a mobile device of the customer.

* * * * *